United States Patent
Nazmy et al.

(10) Patent No.: US 8,906,296 B2
(45) Date of Patent: Dec. 9, 2014

(54) OXIDATION RESISTANT NICKEL ALLOY

(71) Applicant: ALSTOM Technology Ltd, Baden (CH)

(72) Inventors: Mohamed Youssef Nazmy, Fislisbach (CH); Andreas Künzler, Baden (CH); Hanspeter Zinn, Baden-Rütihof (CH); Giuseppe Bandiera, Ehrendingen (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/968,590

(22) Filed: Aug. 16, 2013

(65) Prior Publication Data

US 2014/0050609 A1 Feb. 20, 2014

(30) Foreign Application Priority Data

Aug. 17, 2012 (EP) .................................... 12180759

(51) Int. Cl.
*G01K 1/10* (2006.01)
*C22C 19/05* (2006.01)

(52) U.S. Cl.
USPC ......................................................... 420/443

(58) Field of Classification Search
USPC .......................................... 420/443; 148/426
See application file for complete search history.

(56) References Cited

U.S. PATENT DOCUMENTS

| 4,749,546 A | 6/1988 | Burley |
| 4,834,807 A | 5/1989 | Burley |
| 4,909,855 A | 3/1990 | Burley |
| 2005/0217715 A1 | 10/2005 | Sakurada et al. |

OTHER PUBLICATIONS

Christie W H et al: "*Investigation of decalibrated Nicrosil versus Nisil thermocouples: Quantitative sims analysis using indexed sensitivity factors and oxygen flooding*", Applications of Surface Science, Elsevier BV, NL, vol. 18, No. 3, Jul. 1, 1984, pp. 287-298, XP025931187, ISSN: 0378-5963, DOI: 10.1016/0378-5963(84)90316-7 [retrieved on Jul. 1, 1984].
Haynes International, "Haynes 214 Alloy—A nickel—Chromium—aluminum—iron alloy with outstanding resistance to oxidation", product brochure, 2008 from www.haynesintl.com.
"Other Types of Thermocouples, K-76 Technical Reference", http://www.dugantech.com/Index-Links/Links-Frames.html, as retrieved on Oct. 28, 2013.
Burley, "*Advanced integrally sheathed type N thermocouple of ultra-high thermoelectric stability*", Measurement, vol. 8, No. 1, Jan.-Mar. 1990.

*Primary Examiner* — Jessee Roe

(57) ABSTRACT

The present invention relates to an oxidation resistant Nickel alloy, characterized in the following chemical composition (in % by weight): 4-7 Cr, 4-5 Si, 0.1-0.2 Y, 0.1-0.2 Mg, 0.1-0.2 Hf, remainder Ni and unavoidable impurities. A preferred embodiment has the following chemical composition (in % by weight): 6 Cr, 4.4 Si, 0.1 Y, 0.15 Mg, 0.1 Hf, remainder Ni and unavoidable impurities. This alloy has an improved oxidation resistance and good creep properties at high temperatures.

8 Claims, 3 Drawing Sheets

OXIDATION RESISTANT NICKEL ALLOY

CROSS-REFERENCE TO RELATED APPLICATIONS

This application claims priority to European Application 12180759.8 filed Aug. 17, 2012, the contents of which are hereby incorporated in its entirety.

BACKGROUND

The present invention refers to a type N thermocouples sheath exposed to oxidizing atmospheres at very high temperatures of approximately 1100° C. Such severe operation demands occur for example, when measuring the temperature in modern gas turbines. In particular, the invention relates to an oxidation resistant Ni alloy with improved creep properties.

TECHNICAL FIELD

The type GT24/GT26 gas turbines of the applicant, which are known from the prior art, operate on the basis of the sequential combustion principle. This means, that the compressed air is heated in a first combustion chamber by adding of about 50% of the total fuel (at base load). After this the combustion gas expands through a first turbine (single stage high-pressure turbine), which lowers the pressure by approximately a factor 2. Then the remaining fuel is added in the second combustion chamber, where the combustion gas is heated a second time to the maximum turbine inlet temperature and finally is expanded in the low pressure turbine. The second combustion chamber is designed for spontaneous ignition, i.e. the temperature of the exhaust gases from the first turbine has to allow spontaneous ignition to take place in conjunction with the fuel injected into said chamber. For this reason, it is necessary to monitor and measure the temperature of the hot gas flow. For this purpose, the applicant uses thermocouples provided with sheath.

Known sheath alloys for thermocouples are for example IN600, IN617 and the so-called HAYNES®-214®. This is a γ' strengthened Ni alloy with 4.5% Al with a good tensile and stress rupture behavior which shows unfortunately an unsatisfactory performance with respect to oxidation resistance and mismatch in the coefficient of thermal expansion with thermocouple wire alloys.

Other commercial sheath alloys are for example Nicrobell® and Pyrosil®D, all of them are Ni base alloys with different additional elements in different amounts, for example Si, Y, Mo. They do not show satisfactory oxidation resistance for long time high-temperature applications.

Furthermore, it is well known to use Ni alloys with the trade name Nisil (nickel-silicon) and Nicrosil (nickel-chromium-silicon) as type N thermocouple wires. These alloys possess an improved oxidation behavior and show an enhanced thermoelectric stability for temperature measurements up to 1200° C. relative to other standard base-metal thermocouple alloys because their chemical composition reduces the thermoelectric instability. This is achieved by increasing the chromium and silicon concentrations in a base of nickel to cause transition from internal to external modes of oxidation, and by selecting additional elements, for example Mg, that oxidize to form a diffusion-barrier and hence oxidation inhibiting films. In this use, Nisil serves as the negative leg of the thermocouple and Nicrosil as the positive leg of the type N thermocouple.

Unfortunately, these materials show inherent low creep strength and possess relatively low tensile and stress rupture properties which requires care in the manufacturing and selection of the compatible sheath material.

The known premature failure in the type N thermocouple wires especially in the Nisil leg has been attributed to the mismatch in the thermal expansion coefficient between sheath alloys, such as HAYNES®-214®, IN600 or ss316, and the Nisil and Nicrosil thermocouple wire alloys. The thermo-element conductor wires may fail mechanically because of alternating strains imposed during thermal cycling. The strains are caused primarily by longitudinal stresses which arise because of different temperature coefficients of linear expansion of the thermoelements and the dissimilar sheath alloys.

SUMMARY

The aim of the present invention is to avoid the disadvantages of the prior art that have been mentioned.

The invention is based on the object of finding a material suitable for use as a sheath material for type N thermocouple wires that can be used without any problems in an oxidizing atmosphere in gas turbines at extremely high temperatures. At those temperatures the sheath material should have a sufficient oxidation resistance and relative good stress rupture behavior (good longtime reliability) and a good thermoelectric stability.

According to the invention, this object is achieved by a Nickel alloy with the following chemical composition (in % by weight): 4-7 Cr, 4-5 Si, 0.1-0.2 Y, 0.1-0.2 Mg, 0.1-0.2 Hf, remainder Ni and unavoidable impurities.

A preferred embodiment of the invention is an alloy with the following chemical composition (in % by weight): 6 Cr, 4.4 Si, 0.1 Y, 0.15 Mg, 0.1 Hf, the remainder being Ni and unavoidable impurities.

The alloy according to the invention shows an improved oxidation resistance at high temperatures compared with the known commercial sheath materials, such as HAYNES®-214®, Nicrobell® or Pyrosil®D for type N thermocouple wires, therefore it can be used with an advantage as a sheath material for type N thermocouples at very high temperatures in a oxidation atmosphere. There is no significant mismatch in thermal expansion coefficients between the disclosed alloy and the N thermocouples wires.

BRIEF DESCRIPTION OF THE DRAWINGS

Exemplary embodiments of the invention are illustrated in the drawing, in which.

DETAILED DESCRIPTION

The invention is explained in more detail below on the basis of an exemplary embodiment and the drawings.

Table 1 lists the respective chemical compositions of the tested alloys. The alloying constituents are specified in % by weight.

TABLE 1

| Alloy | Ni | Cr | Al | Fe | Mn | Si | Zr | C | B | Y | other |
|---|---|---|---|---|---|---|---|---|---|---|---|
| HAYNES ® 214 ® | Bal | 16 | 4.5 | 3 | 0.5 | 0.2 | 0.1 | 0.05 | 0.01 | 0.01 | |
| Nisil | Bal | | | | | 4.4 | | | | | 0.15 Mg |
| Nisil-M1 | Bal | 6 | | | | 4.4 | | | | 0.1 | 0.15 Mg 0.1 Hf |
| Nicrosil | Bal | 14.2 | | | | 1.4 | | | | | |
| Nicrobell ® | Bal | 14.3 | | | | 1.4 | | | | | 0.1 Mg 3 Mb |
| Pyrosil ® D | Bal | 22 | | | | 1.4 | | | | 0.1 | 3 Mo |

Alloy Nisil-M1 is an alloy according to the present invention, while the other 5 alloys are commercial available state of the art materials. It is a kind of micro-alloyed Nisil with the addition of 0.1 Y, 0.1 Hf and a significant Cr-content (6%). The big advantage of Nisil-M1 is that there is no change in the thermal expansion behavior compared with Nisil.

Button-size specimens of the different materials with the nominal composition according to Table 1 (without HAYNES®-214®) were prepared by melting in an arc furnace. The chemistry of Nisil-M1 has been designed to simultaneously possess improved oxidation resistance with close thermal expansion coefficient to that of the thermocouple wires made of Nisil or Nicrosil. The prepared button-size specimens were heavily cold rolled at room temperature with a degree of deformation of ca. 70%. The cooled rolled specimens were heat treated at 800° C. for 1 h to achieve a fully recrystallized structure. Mini-size specimens were machined from the heat-treated sections.

Figure 1:
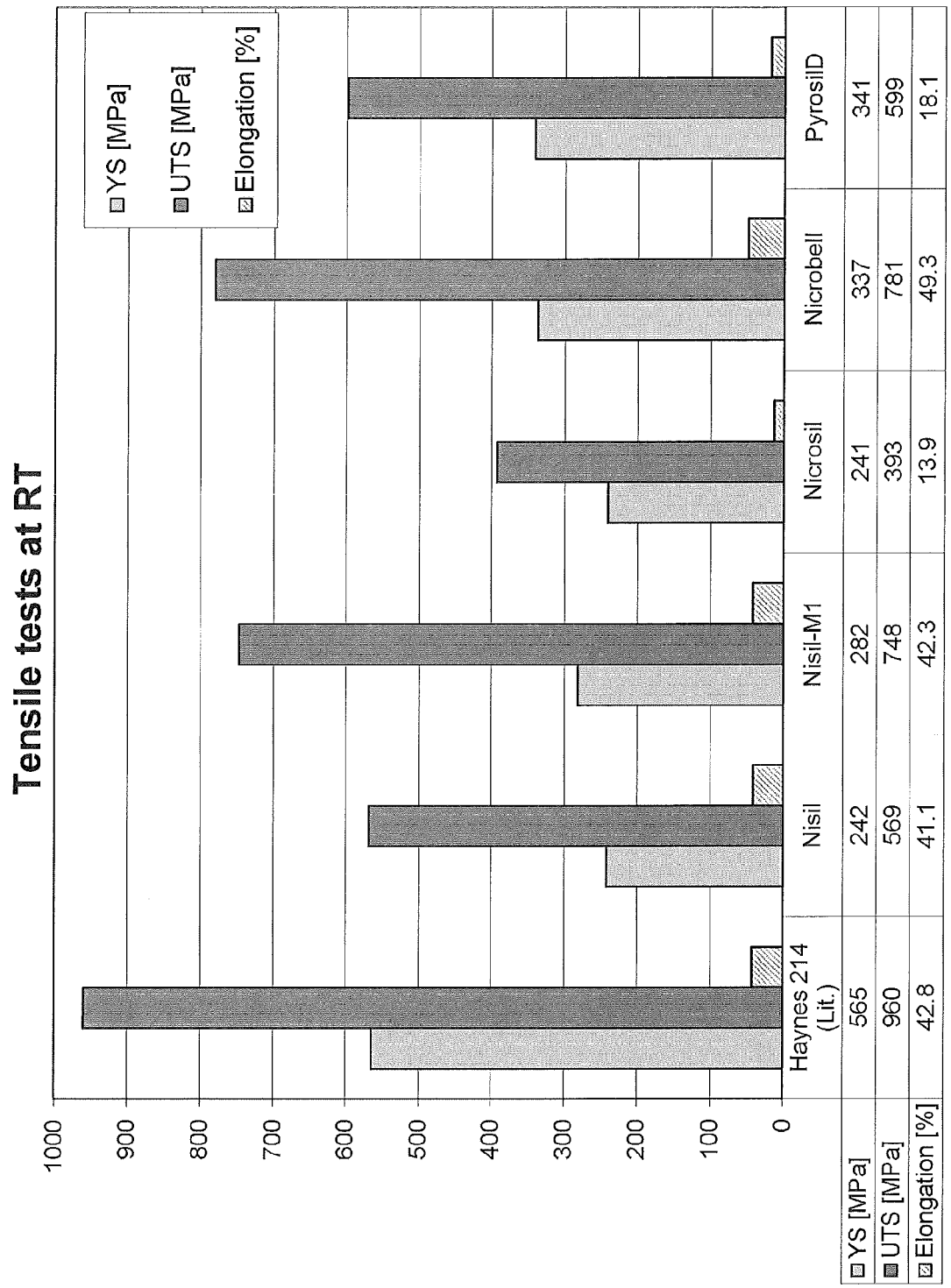
FIG. 1: shows the results of tensile tests at room temperature for an alloy according to the invention and for different commercial alloys.

FIG. 1 shows the results of tensile tests at room temperature for these alloys as well as the corresponding properties of HAYNES®-214® as reported in the literature (see HAYNES®214® ALLOY, HD-3008D, Haynes International, Inc. 2008).

As expected, HAYNES®-214® showed the highest tensile strength as compared with the other alloys, but the alloy according to the present invention, Nisil-M1, exhibited improved tensile strength as compared with Nisil and Nicrosil. This is the result of the different chemical composition, specifically Cr and Hf. Both elements enhance the creep strength and oxidation resistance.

Figure 2:
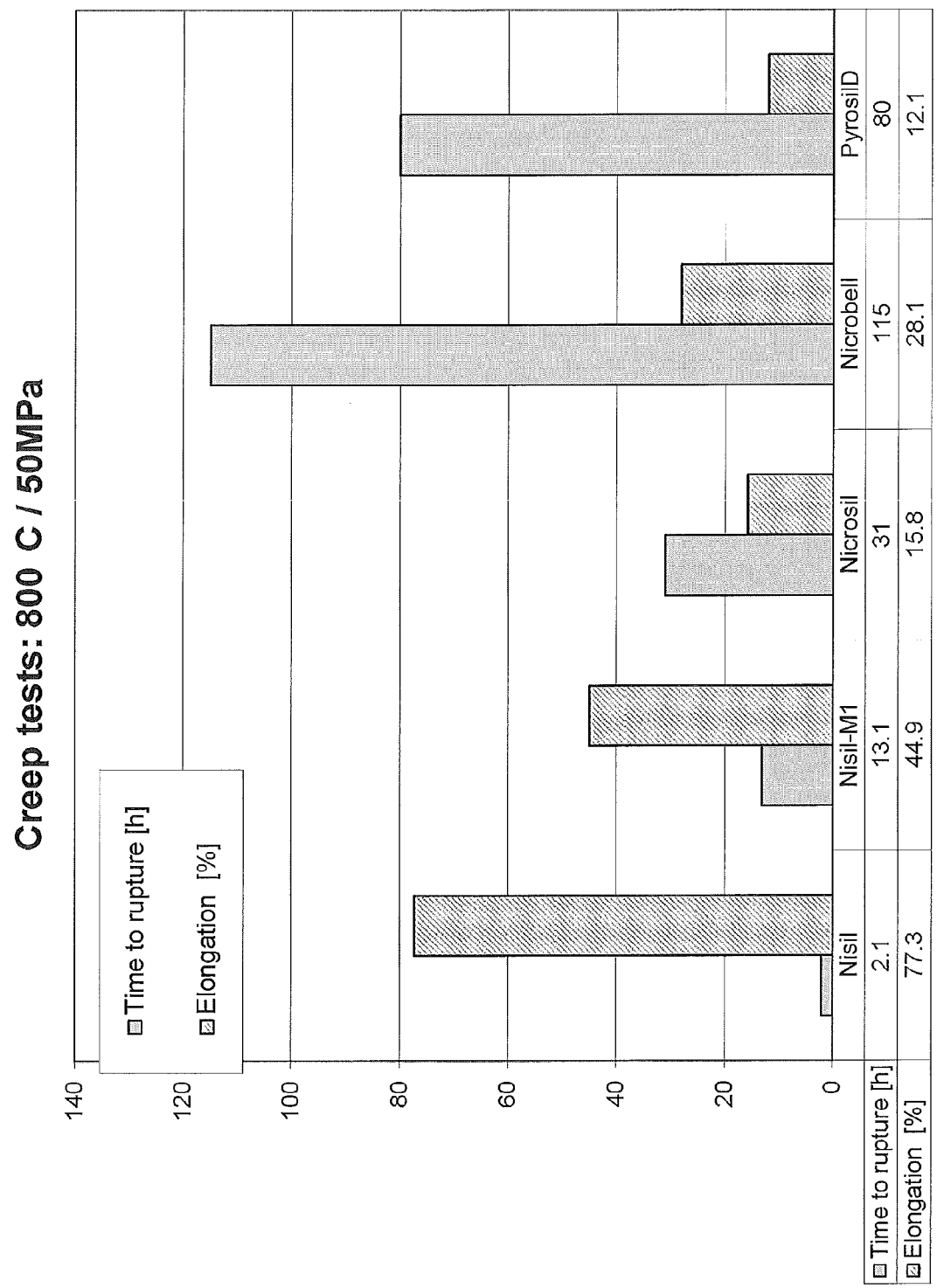
FIG. 2: shows the results of creep tests at 800° C./50 MPa for an alloy according to the invention and for different commercial alloys

The results of the stress rupture at 800° C./50 MPa are given in FIG. 2. The alloy according to the present invention Nisil-M1 has a high elongation (nearly 45%) and a much better stress rupture behavior than that of Nisil, but lower as compared with Nicrosil and the commercial sheath alloys Nicrobell® or Pyrosil®D.

Figure 3:
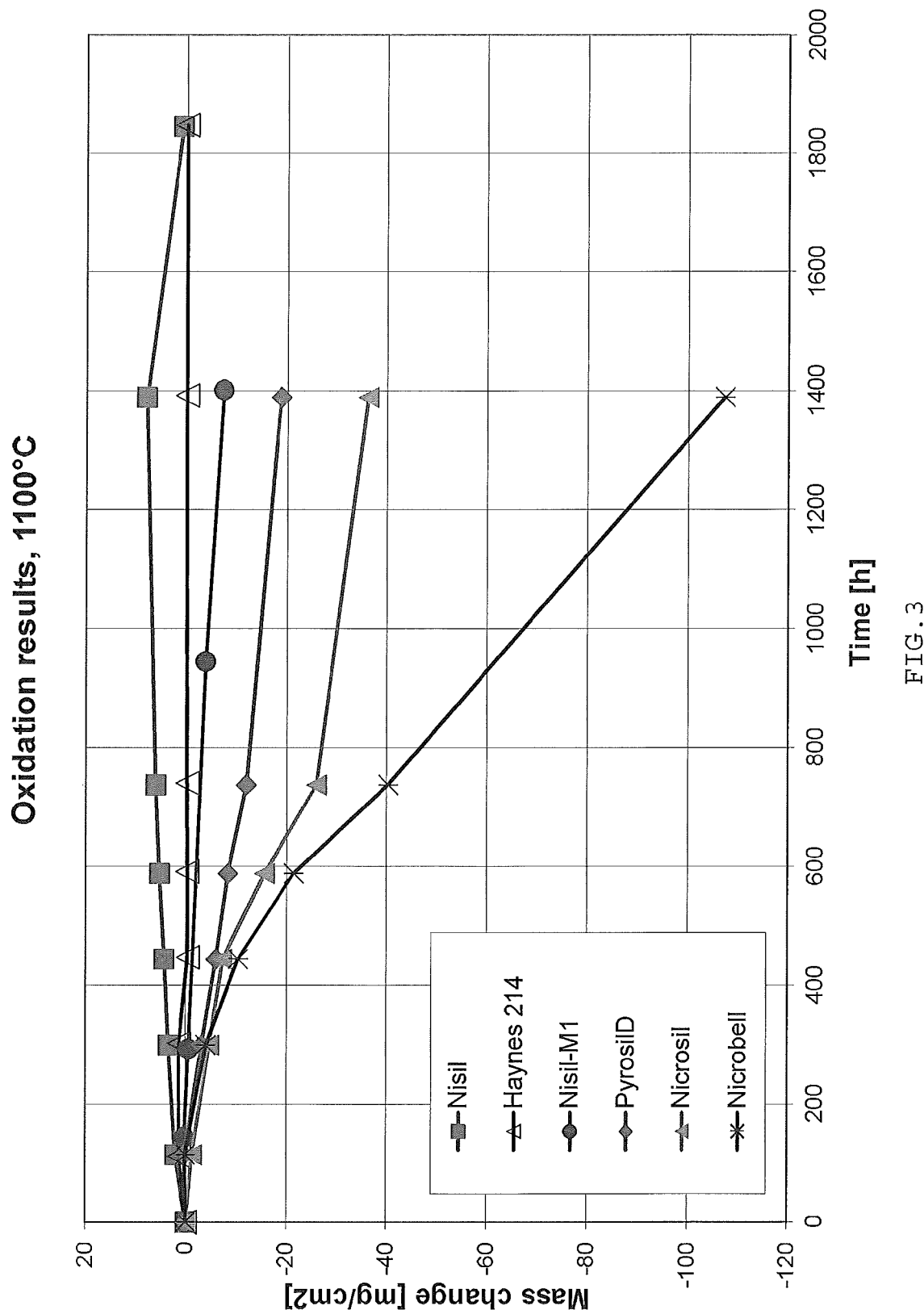
FIG. 3: shows the oxidation behavior at 1100° C. for an alloy according to the invention and for different commercial alloys.

Flat coupons of the mentioned alloys, including HAYNES®-214®, were oxidation tested in air at a temperature of 1000° C. for more than 1500 h. FIG. 3 presents the oxidation results, as weight gain per $cm^2$ of these alloys.

As it can be seen in that figure, Nisil-m1 exhibits an improved oxidation behavior as compared with Nicrosil and the commercial sheath alloys Nicrobell® or Pyrosil®D, but only slightly worse than Nisil and HAYNES®-214®.

The N type thermocouple alloys (Nisil and Nicrosil) possess relatively low tensile and stress rupture properties. These characteristics require care in manufacturing and selection of a compatible sheath material. This is to avoid the mechanically failure of the thermocouple wires due to the mismatch in thermal expansion coefficient between the thermocouple wires and the sheath material. Although the commercial sheath materials Nicrobell® or Pyrosil®D possess close thermal expansion coefficients to that of the thermocouple wires materials (Nisil, Niscrosil) they do not satisfy with respect to oxidation resistance for long-time high temperature applications. This can be achieved with an alloy according to the present invention.

The invention claimed is:

1. Oxidation resistant Nickel alloy, comprising the following chemical composition (in % by weight): 4-7 Cr, 4-5 Si, 0.1-0.2 Y, 0.1-0.2 Mg, 0.1-0.2 Hf, remainder Ni and unavoidable impurities.

2. Oxidation resistant Nickel alloy as claimed in claim 1, comprising 5-6% by weight Cr.

3. Oxidation resistant Nickel alloy as claimed in claim 2, comprising 6% by weight Cr.

4. Oxidation resistant Nickel alloy as claimed in claim 1, comprising 4.4% by weight Si.

5. Oxidation resistant Nickel alloy as claimed in claim 1, comprising 0.1% by weight Y.

6. Oxidation resistant Nickel alloy as claimed in claim 1, comprising 0.15% by weight Mg.

7. Oxidation resistant Nickel alloy as claimed in claim 1, comprising 0.1% by weight Hf.

8. Oxidation resistant Nickel alloy as claimed in claim 1, wherein the alloy is used as a type N thermocouples sheath material.

* * * * *